United States Patent [19]

Tessenske

[11] 4,070,201
[45] Jan. 24, 1978

[54] SPIKE HOLE PLUGGING MATERIAL

[75] Inventor: Dennis J. Tessenske, Union Grove, Wis.

[73] Assignee: Racine Railroad Products, Inc., Racine, Wis.

[21] Appl. No.: 598,062

[22] Filed: July 22, 1975

[51] Int. Cl.$^2$ .................. C08L 95/00; E01B 9/12; E01B 9/14
[52] U.S. Cl. ..................... 106/281 R; 106/15 R; 238/371
[58] Field of Search ............ 106/281 R, 15 AF, 38.8; 238/371; 264/330

[56] References Cited

U.S. PATENT DOCUMENTS

| | | | |
|---|---|---|---|
| 2,256,832 | 9/1941 | King | 106/38.8 |
| 2,644,741 | 7/1953 | King et al. | 106/38.8 |
| 3,191,864 | 6/1965 | Moses | 238/371 |
| 3,235,482 | 2/1966 | Knowles et al. | 106/281 R |
| 3,249,452 | 5/1966 | Plumb | 106/281 R |
| 3,706,580 | 12/1972 | Hudson | 106/15 AF |
| 3,756,960 | 9/1973 | Junghahnel et al. | 106/15 AF |
| 3,776,748 | 12/1973 | Richards | 106/281 R |
| 3,822,137 | 7/1974 | Kemp | 106/15 AF |
| 3,824,109 | 7/1974 | Richards | 106/281 R |

OTHER PUBLICATIONS

Norton, *Grits and Grinds*, vol. 59, No. 7, 1968, p. 15.
The Condensed Chemical Dictionary, Sixth Edition, 1961, p. 123.

*Primary Examiner*—Allan Lieberman
*Attorney, Agent, or Firm*—Wegner, Stellman, McCord, Wiles & Wood

[57] ABSTRACT

A railroad tie spike hole plugging material and method of using the same. The material includes a substantially uniform mixture of about 25–75% by volume of a granular abrasive material having a grit size in the range of about 20–100 grit and abrasive to railroad spikes, and about 25–75% by volume of a granular plastic material having a grit size of about 100 grit or less and a plastic temperature in the range of about 120°–350° F. The material is poured into a hole in a tie and when a spike is driven into the hole, the friction between the abrasive material and the spike generates sufficient heat to plasticize the plastic material. Upon cooling, the material firmly grasps the spike.

5 Claims, No Drawings

SPIKE HOLE PLUGGING MATERIAL

BACKGROUND OF THE INVENTION

This invention relates to the plugging of spike holes in railroad ties to enable the ties to be reused, and, more particularly, to an improved material for plugging such holes and a method of using the same.

Replacement of the rail in railroad rights-of-way almost universally requires the removal of rail spikes from the ties. Frequently, a large percentage of the ties are reusable in that they have not deteriorated to a point requiring replacement. In order to reuse such ties, it is necessary that the holes left therein by the removed spikes be plugged so that when spikes anchoring the new rail are driven into the holes, the spikes will be firmly anchored in the ties.

Moreover, in view of the number of ties required in constructing a railroad right-of-way, and the rapidly increasing cost of such ties, many railroads have resorted to the use of previously used ties removed from abandoned rights-of-way. Again, before such ties can be reused, it is necessary to plug the spike holes therein.

Presently, the holes are plugged with hardwood dowels prior to the driving of spikes therein. While adequate gripping of the spikes is obtained by this method, there is one pronounced problem attendant its use. It is extremely difficult to completely fill the hole down to its root with the dowel. Consequently, an area is frequently left at the bottom of the hole which accumulates water, thereby causing rapid deterioration of the tie.

SUMMARY OF THE INVENTION

It is the principal object of the invention to provide a new and improved material for use in plugging spike holes in railroad ties. It is also an object of the invention to provide a method of using such a material.

An exemplary embodiment of a tie hole plugging material made according to the invention includes about 25-75% by volume of a granular abrasive material having a grit size in the range of about 20-100 grit and about 25-75% of a granular plastic material having a grit size of about 100 grit or less and a plastic temperature in the range of about 120°-350° F. The two materials are mixed together to form a substantially homogeneous or uniform mixture.

According to a highly preferred embodiment, the mixture also includes an effective amount of a wood preservative. Frequently, the wood preservative will be pentachlorophenyl and will be present in the amount of about 1%.

The highly preferred embodiment of the material also contemplates that the abrasive material be hard dry silica, and, preferably, silica having a uniform particle size. The plastic material may be asphalt having a plastic temperature in the range of about 180°-290° F. In a highly preferred embodiment, the abrasive material and the plastic material are included in approximately equal parts by volume.

The invention also contemplates a method of filling spike holes in railroad ties to permit the ties to be reused comprising the step of at least partially filling the hole with the above mixture.

The invention also contemplates the method of firmly placing a railroad spike in a previously formed hole in a wooden tie wherein the hole is at least partially filled with a substantially homogeneous granular mixture of a material abrasive to a railroad spike and a plastic material normally substantially solid at ambient temperatures. The method includes, after the step of partially filling the hole, the step of driving a railroad spike into the hole and the mixture therein at a rate sufficient to cause the friction between the abrasive material and the railroad spike to generate sufficient heat to plasticize the plastic material. The step of driving the railroad spike is followed by the step of permitting the mixture to cool and solidify.

Other objects and advantages will become apparent from the following specification.

DESCRIPTION OF THE PREFERRED EMBODIMENTS

A railroad tie spike hole plugging composition or material made according to the invention is comprised of two principal components. The first is a granular abrasive material which is abrasive to a conventional railroad spike. The second is a granular plastic material that is substantially solid at ambient temperatures and has an elevated plastic temperature, i.e., the temperature at which it is plasticized and begins to flow.

The mixture of the two components is substantially uniform or homogeneous and is placed into a hole in a railroad tie as by pouring. In this respect, it is preferable that the granule size of each of the two components be such that the mixture may easily flow to the root of the hole to be plugged to preclude the existence of any moisture-holding space therein after a spike is driven into the hole and the material therein.

When a spike is driven into the hole containing the material, the friction between the abrasive generates heat to plasticize the plastic material. As a consequence, it will flow into the interstices of the wood of the railroad tie and about the abrasive material and the spike, wetting the surface of each.

After the driving operation has been completed, the material will cool under ambient conditions and set up solidly to provide an excellent bond between the spike and the tie.

Typically, the abrasive material will be included in the amount of 25-75% by volume as will the plastic material. At the extreme limits of the range of inclusion of each material, satisfactory bonding for some uses will occur. However, to provide a compound capable of universal use, it is highly preferred that the abrasive material be included in the amount of 45-65% by volume and the plastic material included in the amount of 33-55% by volume.

While the principal concern in terms of size of the granular abrasive material revolves about the ability of the mixture to flow to the very root of the hole to be plugged, various secondary considerations of practical importance dictate that the preferred grit size be in the range of 20-100 grit. Similarly, it is desirable that the grit size of the plastic material be 100 grit or less, and, preferably, just slightly smaller than the grit size of the abrasive material so as to preclude separation of the two materials into fractions.

The reasons for the preferred range of grit size for the abrasive is as follows. If the grit size of the abrasive is greater than 100 grit, the strength of the ultimate bond begins to decrease at an undesirable rate. Similarly, if a grit smaller than 20 grit is employed, employing present day methods of driving railroad spikes, difficulty in driving the spike into the hole partially filled with the material is encountered.

It is also desirable that the granules of the abrasive material be uniform to maximize bonding strength. Thus, in an optimum embodiment of the invention, a very hard, dry silica is employed as the abrasive material because of its abundance and uniform particle size. Preferably, 40 grit silica is employed.

The plastic material employed preferably has a plastic temperature in the range of about 120°-350° F. When the lower end of the temperature range is passed, the material may begin to become plastic at ambient temperatures, resulting in a poor bond. When the high end of the temperature range is exceeded, with present day spike driving equipment and/or methods, difficulty is encountered in trying to drive a spike sufficiently rapidly to generate sufficient friction to plasticize the material.

The highly preferred embodiment of the invention contemplates that the plastic material have a plastic temperature in the range of 180°-290° F. If the plastic temperature of the plastic material employed is below 180° F., it is not subject to universal use. For example, in certain of the southern climes, the material, when stored in hoppers or the like, may be subjected to an ambient temperature on the order of 150°-160° F. Consequently, for lower plastic temperatures than 180° F., there exists the possibility that some plasticization will take place during storage, with the result that the compound will not be free flowing. Of course, where universal use is not a consideration, the lower limit of the plastic temperature of the plastic material may be as little as the previously mentioned 120° F.

The preferred upper plastic temperature for the plastic material of 290° F. is based on the fact that plasticity during a spike driving operation can be achieved with the vast majority of mechanized spike driving equipment in use today as well as by manual spike driving with sledges or the like, thereby providing for universal usage of the material. Again, where such universal usage is not a criteria, a higher plastic temperature is permissible.

An optimum embodiment of the invention contemplates a plastic temperature of the plastic material on the order of 240° F.

A preferred form of the plastic material employed is a solid petroleum redistilled byproduct comparable to asphalt because of its abundance and relatively low cost. However, it is to be understood that other plastic materials having the foregoing characteristics may be employed as full or partial substitutes for such a byproduct.

In a highly preferred embodiment of the invention, the particular byproduct employed to achieve the optimum characteristics, as set forth above, is a distilled asphalt marketed under the brand name "Compound 412 Distilled Asphalt" available from the Witco Chemical Company.

It is frequently desirable to employ in the mixture a wood preservative. The wood preservative will be employed in an effective amount which, of course, will vary depending upon the particular preservative employed.

In a preferred embodiment of the invention, pentachlorophenyl is employed in the amount of 1% by volume. It has been found that pentachlorophenyl is advantageous over other wood preservatives in that it reacts, to some extent, with the asphalt-like material to harden the same and thereby provide an improved bond. Creosote may be alternately employed.

The optimum compound, according to the invention, may be summarized as follows, in parts by volume: silica — 49%, highly distilled asphalt — 50%, pentachlorophenyl — 1%.

As alluded to previously, a method of plugging a hole in a railroad tie includes the step of at least partially filling the hole with a mixture made up of the foregoing components in the ranges of inclusion specified. Similarly, a method of firmly placing a railroad spike in a previously formed hole in a wooden tie comprises the steps of at least partially filling the hole with a substantially homogeneous granular mixture of a material abrasive to a railroad spike and a plastic material normally substantially solid at ambient temperatures. The step of partially filling the hole is followed by the step of driving the railroad spike into the hole and the mixture therein at a rate sufficient to cause the friction between the abrasive material and the railroad spike to generate sufficient heat to plasticize the plastic material. Finally, the mixture is permitted to cool and solidify to establish a firm bond between the spike and the tie.

From the foregoing, it will be appreciated that a tie hole plugging made according to the invention and method of using the same provide a substantial advantage over the presently employed method of filling such holes in that they positively insure that the hole will be filled to its root to preclude the existence of a water accumulating hole which could result in rapid tie deterioration. The material is granular and therefore easily handled. It may be employed in filling the holes with a minimum of effort in contrast to the present method of driving a dowel into such a hole. The preferred materials employed are relatively inexpensive and abundant, allowing the material and the methods of its use to be employed economically favorably with respect to present methods.

I claim:

1. A spike hole plugging material including a substantially uniform mix of the following materials by volume:
   about 25–75% of a granular abrasive material having a grit size in the range of about 20–100 grit and abrasive to spikes; and
   about 25–75% of a granular plastic material having a grit size of about 100 grit or less and having a plastic temperature no lower than about 120° F. and in the range of about 120°–350° F.

2. A spike hole plugging material including a substantially uniform mix of the following materials by volume:
   about 25–75% of a granular abrasive material having a grit size in the range of about 20–100 grit and abrasive to spikes;
   about 25–75% of a granular plastic material having a grit size of about 100 grit or less and having a plastic temperature in the range of about 120°–350° F.; and
   an effective amount of a wood preservative.

3. A spike hole plugging material including a substantially uniform mix of the following materials by volume:
   about 25–75% of a granular abrasive material having a grit size in the range of about 20–100 grit and abrasive to spikes;
   about 25–75% of a granular plastic material having a grit size of about 100 grit or less and having a plastic temperature in the range of about 120°–350° F.; and
   an effective amount of a wood preservative;
   said abrasive material being silica and said plastic material being asphalt having a plastic temperature in the range of about 180°–290° F., said wood preservative being pentachlorophenyl.

4. The spike hole plugging material of claim 1 wherein said abrasive material and said plastic material are included in approximately equal percentages.

5. A tie hole plugging compound comprising a substantially homogeneous mixture of the following materials:
   about 45–65% by volume of silica having a grit size in the range of 20–100;
   33–55% by volume of a granular, redistilled ashalt having a grit size of 100 or less; and
   an effective amount of pentachlorophenyl.

* * * * *